United States Patent
Bjorkholm

(10) Patent No.: US 7,162,005 B2
(45) Date of Patent: Jan. 9, 2007

(54) RADIATION SOURCES AND COMPACT RADIATION SCANNING SYSTEMS

(75) Inventor: Paul Bjorkholm, Newport Beach, CA (US)

(73) Assignee: Varian Medical Systems Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/199,781

(22) Filed: Jul. 19, 2002

(65) Prior Publication Data
US 2004/0057554 A1  Mar. 25, 2004

(51) Int. Cl.
G01N 23/04 (2006.01)

(52) U.S. Cl. .......................................... 378/57; 378/143

(58) Field of Classification Search ................ 378/124, 378/136–138, 147, 119, 126, 121, 149, 142, 378/143, 44–90, 34–35
See application file for complete search history.

(56) References Cited

U.S. PATENT DOCUMENTS

| | | | |
|---|---|---|---|
| 3,018,374 | A | 1/1962 | Pritchett |
| 3,636,353 | A | 1/1972 | Untermyer |
| RE28,544 | E | 9/1975 | Stein et al. |
| 3,924,132 | A | 12/1975 | Koslow |
| 4,031,545 | A | 6/1977 | Stein et al. |
| 4,149,081 | A | 4/1979 | Seppi |
| 4,229,654 | A | 10/1980 | Arya et al. |
| 4,251,726 | A | 2/1981 | Alvarez |
| 4,357,535 | A | 11/1982 | Haas |

(Continued)

FOREIGN PATENT DOCUMENTS

WO  WO 96/13839  5/1996

OTHER PUBLICATIONS

McDonald, Marci; "Checkpoint Terror Border Searches Snarl the Free Flow of Goods" U.S. News and World Report, p. 52, Feb. 11, 2002.

(Continued)

Primary Examiner—Courtney Thomas
Assistant Examiner—Hoon Song
(74) Attorney, Agent, or Firm—Brandon N. Sklar; Kaye Scholer LLP

(57) ABSTRACT

An X-ray source is disclosed comprising a source of high energy electrons that travel along a longitudinal path. Target material lies along the longitudinal path and X-ray radiation is generated due to impact of the high energy electrons with the target. Shielding material is provided around at least a portion of the target. The shielding material defines a slot extending from the target to an exterior surface of the shielding material, to allow passage of generated radiation. The slot has an axis transverse to the longitudinal path. The axis may be perpendicular longitudinal path. The shielding material may define a plurality of slots having transverse axes. The source of high energy electrons may be a linear accelerator, for example. Scanning systems incorporating such sources are also disclosed. The scanning system comprises a conveying system having a longitudinal axis and the radiation source may be positioned so that the longitudinal path forms an acute angle with respect to the longitudinal axis, to decrease the size of the scanning unit as compared to a unit where the longitudinal axis is perpendicular to the longitudinal path. The longitudinal axis may be parallel to the longitudinal path, to form a more compact scanning system. A plurality of slots may be defined in the shielding material and a corresponding number of conveying systems may be provided to examine a plurality of objects concurrently. Methods of generating radiation and methods of examining objects are also disclosed.

106 Claims, 13 Drawing Sheets

U.S. PATENT DOCUMENTS

| | | | |
|---|---|---|---|
| 4,430,568 A | 2/1984 | Yoshida et al. | |
| 4,521,900 A | 6/1985 | Rand | |
| 4,599,740 A | 7/1986 | Cable | |
| 4,671,256 A | 6/1987 | Lemelson | |
| 4,722,096 A | 1/1988 | Dietrich et al. | |
| 4,726,046 A * | 2/1988 | Nunan | 378/65 |
| 4,918,315 A | 4/1990 | Gomberg et al. | |
| 4,941,162 A | 7/1990 | Vartsky et al. | |
| 4,956,856 A | 9/1990 | Harding | |
| 4,987,584 A | 1/1991 | Doenges | |
| 5,044,002 A | 8/1991 | Stein | |
| 5,065,418 A | 11/1991 | Bermbach et al. | |
| 5,076,993 A | 12/1991 | Sawa et al. | |
| 5,098,640 A | 3/1992 | Gozani et al. | |
| 5,111,494 A * | 5/1992 | Turner et al. | 378/138 |
| 5,115,459 A | 5/1992 | Bertozzi | |
| 5,124,554 A | 6/1992 | Fowler et al. | |
| 5,124,658 A | 6/1992 | Adler | |
| 5,153,439 A | 10/1992 | Gozani et al. | |
| 5,200,626 A | 4/1993 | Schultz et al. | |
| 5,251,240 A | 10/1993 | Grodzins | |
| 5,278,418 A | 1/1994 | Broadhurst | |
| 5,313,511 A | 5/1994 | Annis et al. | |
| 5,367,552 A | 11/1994 | Peschmann | |
| 5,410,156 A | 4/1995 | Miller | |
| 5,420,905 A | 5/1995 | Bertozzi | |
| 5,422,926 A * | 6/1995 | Smith et al. | 378/121 |
| 5,490,218 A | 2/1996 | Krug et al. | |
| 5,491,734 A | 2/1996 | Boyd et al. | |
| 5,493,596 A | 2/1996 | Annis | |
| 5,495,106 A * | 2/1996 | Mastny | 250/253 |
| 5,524,133 A | 6/1996 | Neale et al. | |
| 5,557,108 A | 9/1996 | Tumer | |
| 5,600,303 A | 2/1997 | Husseiny et al. | |
| 5,600,700 A | 2/1997 | Krug et al. | |
| 5,611,502 A | 3/1997 | Edlin et al. | |
| 5,638,420 A | 6/1997 | Armistead | |
| 5,642,394 A | 6/1997 | Rothschild | |
| 5,692,028 A | 11/1997 | Geus et al. | |
| 5,692,029 A | 11/1997 | Husseiny et al. | |
| 5,696,806 A | 12/1997 | Grodzins et al. | |
| 5,729,582 A | 3/1998 | Ham et al. | |
| 5,784,430 A * | 7/1998 | Sredniawski | 378/57 |
| 5,809,106 A * | 9/1998 | Kitade et al. | 378/132 |
| 5,818,054 A | 10/1998 | Randers-Pehrson et al. | |
| 5,838,758 A | 11/1998 | Krug et al. | |
| 5,838,759 A | 11/1998 | Armistead | |
| 5,841,832 A | 11/1998 | Mazess et al. | |
| 5,848,115 A * | 12/1998 | Little et al. | 378/4 |
| 5,917,880 A * | 6/1999 | Bjorkholm | 378/57 |
| 5,930,326 A | 7/1999 | Rothschild et al. | |
| 5,974,111 A | 10/1999 | Krug et al. | |
| 6,009,146 A | 12/1999 | Adler et al. | |
| 6,078,642 A | 6/2000 | Simanovsky et al. | |
| 6,088,423 A | 7/2000 | Krug et al. | |
| 6,151,381 A | 11/2000 | Grodzins et al. | |
| 6,192,104 B1 * | 2/2001 | Adams et al. | 378/90 |
| 6,218,943 B1 | 4/2001 | Ellenbogen | |
| 6,249,567 B1 | 6/2001 | Rothschild et al. | |
| 6,269,142 B1 | 7/2001 | Smith | |
| 6,278,115 B1 | 8/2001 | Annis et al. | |
| 6,292,533 B1 | 9/2001 | Swift et al. | |
| 6,347,132 B1 | 2/2002 | Annis | |
| 6,445,766 B1 * | 9/2002 | Whitham | 378/65 |
| 6,453,007 B1 * | 9/2002 | Adams et al. | 378/90 |
| 6,580,940 B1 * | 6/2003 | Gutman | 600/427 |
| 6,628,745 B1 * | 9/2003 | Annis et al. | 378/21 |
| 6,778,633 B1 * | 8/2004 | Loxley et al. | 378/113 |
| 6,813,336 B1 * | 11/2004 | Siochi | 378/65 |

OTHER PUBLICATIONS

Grodzins, Lee; Nuclear Techniques For Finding Chemical Explosives In Airport Luggage; Beam Interactions With Materials and Atoms; May 1991; pp. 829-833; vol. B56/57, Part II; Elsevier Science Publishers B.V. (North-Holland); Holland.

McCall, R.C., and Swanson, W.P., "Neutrons and their Characteristics," Proceedings of a Conference on Neutrons from Electron Medical Accelerators, pp. 75-86, Apr. 9-10, 1979.

* cited by examiner

RADIATION SOURCES AND COMPACT RADIATION SCANNING SYSTEMS

FIELD OF THE INVENTION

Radiation sources and radiation scanning systems. More particularly, X-ray radiation sources emitting radiation transverse to a longitudinal axis of the source and X-ray scanning systems using such sources for examining the contents of an object, for example.

BACKGROUND OF THE INVENTION

Radiation is commonly used in the non-invasive inspection of objects such as luggage, bags, briefcases, and the like, to identify hidden contraband at airports and public buildings. The contraband may include hidden guns, knives, explosive devices and illegal drugs, for example.

FIG. 1 is a front view of one common X-ray scanning system 10, referred to as a line scanner. The object 12 to be inspected is conveyed through a shielded tunnel 13 between a stationary source of radiation 14, such as X-ray radiation, and a stationary detector array 16, by a conveying system 18. The radiation is collimated into a fan beam 20. Windows 21a, 21b are provided in the walls of the tunnel 13 to allow for the passage of radiation to the object 12 from the source 14 and from the object 14 to the detector array 16. The detector array 16 may also be provided within the shielded tunnel 13, in which case only one window 21a would be required. The conveyor system 18 may comprise a mechanically driven belt comprising material that causes low attenuation of the radiation. The conveyor system 18 can also comprise mechanically driven rollers, with gaps in the rollers to allow for the passage of the radiation. Shielding walls 22 surround the source 14, the detector 16 and a portion of the conveying system 18. Openings (not shown) are provided in the shielding walls 22 for the object to be conveyed into and out of the scanning system 10 by the conveying system 18. A second stationary source (not shown) may be provided above the conveying system 18 and a second stationary detector (not shown) may be provided below the conveying system (or vice-a-versa), to examine the object 10 from another angle.

Radiation transmitted through the object 12 is attenuated to varying degrees by the object and its contents. The attenuation of the radiation is a function of the density and atomic composition of the materials through which the radiation beam passes. The attenuated radiation is detected and radiographic images of the contents of the object 12 are generated for inspection. The images show the shape, size and varying densities of the contents.

The source 14 is typically a source of X-ray radiation of about 160 KeV to about 450 KeV. The X-ray source 14 in this energy range may be an X-ray tube. As shown in FIG. 1, the X-ray source 14 must be displaced a sufficient distance from the object 12 so that the fan beam 20 intercepts entire object. The fan angle 74 may be from about 30 degrees to about 90 degrees, for example. X-ray scanning systems, such as the system 10, are generally large.

X-ray radiation of 450 KeV will not completely penetrate large objects such as cargo containers. Standard cargo containers are typically 20–50 feet long (6.1–15.2 meters), 8 feet high (2.4 meters) and 6–9 feet wide (1.8–2.7 meters). Air cargo containers, which are used to contain plural pieces of luggage stored in the body of an airplane, may range in size from about 35×21×21 inches (0.89×0.53×0.53 meters) up to about 240×96×118 inches (6.1×2.4×3.0 meters). In contrast, typical airport scanning systems for carry-on bags have tunnel entrances up to about 0.40×0.60 meters. Only bags that fit through the tunnel may be inspected. Scanning systems for checked luggage have tunnel openings that are only slightly larger. Large collections of objects, such as many pieces of luggage, may also be supported on a pallet. Pallets, which may have supporting side walls, may be of comparable sizes as cargo containers. The low energies used in typical X-ray luggage and bag scanners, described above, are too low to penetrate through the much larger cargo containers or collections of objects. In addition, many such systems are too slow to economically inspect larger objects, such as cargo containers.

To inspect larger cargo containers, X-ray radiation of at least about 1 MeV range is required. Linear accelerators may be used to generate X-ray radiation in the MeV range. Linear accelerators are long (about 12–18 inches). In addition, the intensity of the radiation is greatest in a forward direction, along the longitudinal axis of the electron beam. The uniformity of the emitted radiation decreases as the angle from the forward direction is increased. To maintain beam uniformity, at average energy distortions of about 9 MeV, for example, narrow beams having an arc up to about 30 degrees tend to be used. With average energy distributions of about 3 MeV, beams having an arc up to about 65 degrees may be used. The smaller the arc, the farther the source must be in order to intercept the entire object. The length of the high energy X-ray sources and the beam arc tend to make higher energy X-ray scanning systems large. Since the space occupied by an X-ray scanning system could often be used for other important purposes, a more compact X-ray scanning system would be advantageous.

FIG. 2 is a schematic axial sectional view of an example of a prior art charged particle standing wave accelerator structure 50, referred to as a linear accelerator. The linear accelerator 50 comprises a chain of electromagnetically coupled, doughnut shaped resonant cavities 52, 54, with aligned central beam apertures 56. An electron gun 57 at one end of the chain of cavities emits an electron beam 57 through the apertures 56. A target 60 of tungsten, for example, is provided at an opposite end of the cavities 52, 54. The cavities 52, 54 are electromagnetically coupled together through a "side" or "coupling" cavity 61 that is coupled to each of the adjacent pair of cavities by an iris 62. The cavities are under vacuum.

Microwave power enters one of the cavities along the chain, through an iris 66 to accelerate the electron beam. The linear accelerator is excited by microwave power at a frequency near its resonant frequency, between about 1000 to about 10,000 MHz, for example. After being accelerated, the electron beam 58 strikes the target 60, causing the emission of X-ray radiation.

Movable plungers or probes 68 extend radially into one of the coupling cavities 70. One probe 68 is shown in FIG. 2. A corresponding probe is provided in the cavity 70 behind the probe 68 and cannot be seen in this view. The probes are moved under the control of a computer program to alter the magnetic fields within the cavity, to vary the energy of the accelerating electrons. The energy of the radiation generated by the electrons as the electron beam 57 impact the target is thereby varied. Such a linear accelerator 50 is described in more detail in U.S. Pat. No. 6,366,021 B1, which is assigned to the assignee of the present invention and is incorporated by reference, herein. Linear accelerators are also described in U.S. Pat. Nos. 4,400,650 and 4,382,208, which are also assigned to the assignee of the present invention and are incorporated by reference, herein.

SUMMARY OF THE INVENTION

In accordance with one embodiment of the invention, an X-ray source is disclosed comprising a source of high energy electrons that travel along a longitudinal path. Target material lies along the longitudinal path and X-ray radiation is generated due to impact of the high energy electrons with the target. Shielding material is provided around at least a portion of the target. The shielding material defines a slot extending from the target to an exterior surface of the shielding material, to allow passage of generated radiation. The slot has an axis transverse to the longitudinal path. The axis may be perpendicular to the longitudinal path. The shielding material may define a plurality of slots extending from the target to an exterior surface of the shielding material and the axis of at least some of the plurality of slots may be perpendicular to the longitudinal path, as well.

The source of high energy electrons may comprise a source of electrons and an accelerating chamber. The chamber receives electrons from the source and accelerates the electrons. The accelerating chamber may be a linear accelerator, for example. The longitudinal path is defined in part by a tube extending from the source of high energy electrons, wherein the shielding material is around at least a portion of the tube.

In accordance with another embodiment, an X-ray source is disclosed comprising a housing defining a chamber to accelerate electrons and an output of the chamber. The chamber has a first longitudinal axis and the output is aligned with the first longitudinal axis to allow passage of accelerated electrons from the chamber. A tube defining a passage having a second longitudinal axis has a proximal end coupled to the output of the housing such that the second longitudinal axis is aligned with the first longitudinal axis and accelerated electrons can enter the passage. A target material is provided within the tube, wherein impact of the target material by accelerated electrons causes generation of X-ray radiation. Shielding material is provided around at least a portion of the tube around the target. The shielding material defines a slot extending from the target to an exterior surface of the shielding material. The slot allows the generated radiation to exit. The slot has an axis transverse to the first and second longitudinal axes. The axis of the slot may be perpendicular to the first and second axes. The slot may define a fan beam or a cone beam, for example. The housing may be a linear accelerator, for example.

The shielding material may define a plurality of slots extending from the target to the exterior surface of the shielding material. The slots may be transverse to the first and second axes. The slots may each have a respective axis perpendicular to the first and second axes.

Two shielded targets comprising target material surrounded by shielding material defining a slot through the shielding material, may be provided and a bend magnet may selectively direct electrons to one or the other target. One target may be aligned with the longitudinal axis of the housing and a second bend magnet may be provided to direct electrons from the first bend magnet to the other shielded target. When used in a scanning unit, each slot may irradiate a different side of an object being examined.

In accordance with another embodiment of the invention, a system for examining an object comprises a conveyor system to move the object through the system along a first longitudinal axis and a source of radiation. The source of radiation comprises a source of high energy electrons that travel along a longitudinal path. A target material lies along the longitudinal path. The target material generates X-ray radiation when impacted by the high energy electrons. Shielding material is provided around at least a portion of the target. The shielding material defines a slot extending from the target to an exterior surface of the shielding material, to allow passage of the generated radiation. The slot has an axis transverse to the longitudinal path. The radiation source is positioned with respect to the conveying system such that radiation emitted through the slot will irradiate an object for inspection on the conveying system. The source of radiation may be on a first side of the conveying system and a detector may be provided on a second side of the conveying system to detect radiation transmitted through the object. The source of radiation may be a source of X-ray radiation.

The radiation source may have a second longitudinal axis and the first longitudinal axis and the second longitudinal axis may form an acute angle. The smaller the angle between the first and second longitudinal axes, the more compact the scanning system. For example, the acute angle may be less than or equal to 45 degrees. The acute angle may be less than or equal to 10 degrees, for a more compact system. The first longitudinal axis and the second longitudinal axis may also be parallel for an even more compact system.

The shielding material may define a plurality of slots to form a plurality of radiation beams transverse to the longitudinal path. A corresponding plurality of conveying systems may be provided so that the plurality of radiation beams may be used to examine a plurality of objects concurrently. A corresponding number of shutters may be coupled to the system, to selectively close one or more of the slots when not needed.

In accordance with another embodiment of the invention, a scanning system is disclosed comprising two targets surrounded by shielding material defining respective slots and one or two bend magnets to selectively direct the electrons to one or the other target. The slots in the shielded targets are positioned with respect to a conveying system to irradiate different sides of an object.

In accordance with another embodiment, an X-ray scanning system to examine an object is disclosed comprising a conveyor system to move the object through the system along a first longitudinal axis and an elongated X-ray source having a second longitudinal axis. The X-ray source is capable of emitting X-ray radiation with an average energy of at least 1 MeV and is supported adjacent to the conveying system such that the first longitudinal axis is parallel to the second longitudinal axis. The X-ray source may be on a first side of the conveying system and a detector may be on a second side of the conveying system, to detect X-ray radiation transmitted through the object.

A method of generating X-ray radiation is also disclosed comprising colliding high energy electrons traveling along a longitudinal path with a target surrounded by shielding material to generate radiation and collimating the generated radiation into a radiation beam transverse to the longitudinal path by a slot extending from the target through the shielding material.

A method of examining contents of an object with a radiation source is also disclosed also comprising colliding high energy electrons traveling along a longitudinal path with a target surrounded by shielding material to generate radiation. The generated radiation is collimated into a radiation beam transverse to the longitudinal path by a slot extending from the target through the shielding material. The object is irradiated and radiation interacting with the object is detected.

DESCRIPTION OF THE PREFERRED EMBODIMENTS

Figure 2:
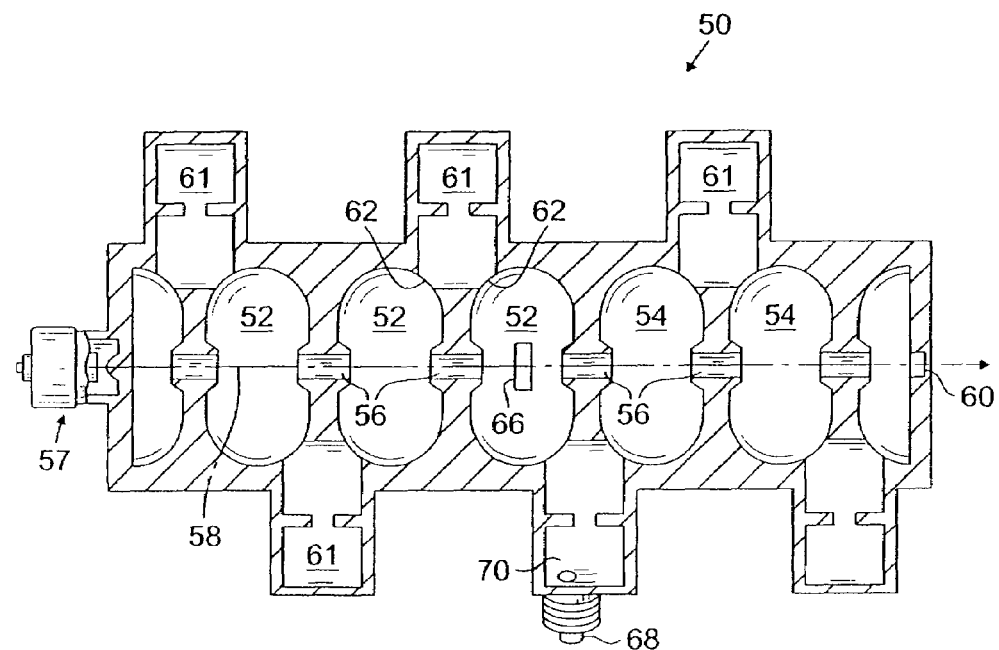
FIG. 2 is a schematic axial sectional view of a prior art charged particle standing wave accelerator structure, referred to as a linear accelerator.
Figure 3:
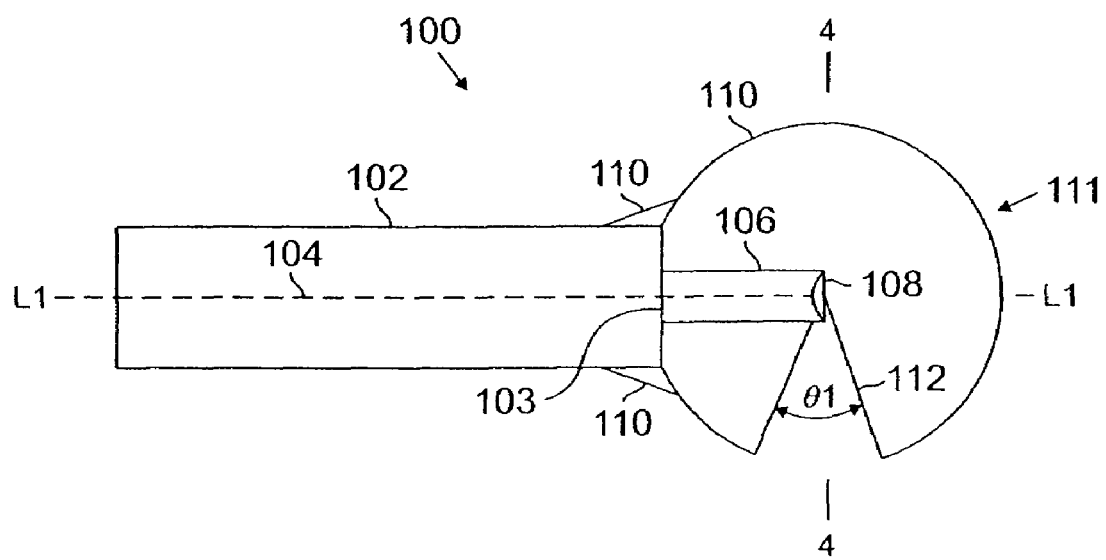
FIG. 3 is a schematic representation of an X-ray radiation source, in accordance with an embodiment of the invention.

FIG. 3 is a schematic representation of a radiation source 100 in accordance with an embodiment of the invention. In this embodiment, the radiation source 100 is an X-ray source comprising a linear accelerator body 102, indicated schematically. The linear accelerator body 102 may have substantially the same configuration as the linear accelerator 50 of FIG. 2, or other configurations known in the art. The movable plungers to vary the energy of the X-ray radiation are optional. An electron beam 103, shown in phantom, follows a path through the linear accelerator body 102 along a longitudinal axis L1 of the body. In the linear accelerator body 102 used in this embodiment, the target 32 of the linear accelerator 50 is removed, leaving an open output end 103. A proximal end of a tube 106, referred to as a drift tube, is connected to the open end 104 of the linear accelerator body 102, in communication with and extending from the open output end. The drift tube 106 may have a diameter of from about 6 to about 10 mm, for example. The drift tube 106 may be the same material as the linear accelerator body 102, to facilitate connection of the drift tube 106 to the linear accelerator body. The drift tube 106 and linear accelerator body 102 may be metal, for example. The drift tube 106 may be other materials, as well. Both the cavities within the linear accelerator body 102 and the interior of the drift tube are under vacuum conditions. The linear accelerator body 102 may optionally include the probes 68, or another such mechanism, to enable the selective generation of X-ray radiation of multiple energy distributions, if desired.

A target material 108 of a metal with a high atomic number and a high melting point, such as tungsten or another refractory metal, is provided at distal end of the drift tube 106. Shielding material 110, such as tungsten, steel or lead, is provided around the drift tube 106, the target material 108 and may extend over a distal portion of the linear accelerator body 102, as well. The shielding material 110 may be in the shape of a sphere, for example, and the target material 108 may be at the center of the sphere, within the drift tube 106. The shielding material 110 may have other shapes, as well. The drift tube 106, the target material 108 and the shielding material 110 are referred to as a "shielded target 111".

Figure 4:
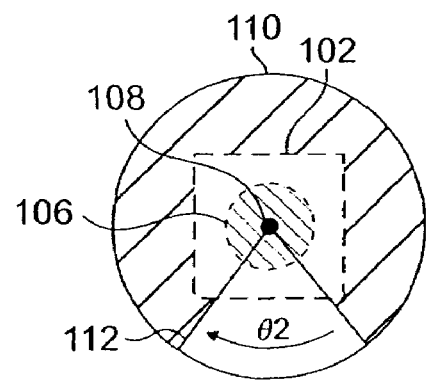
FIG. 4 is a front, cross-sectional view of the forward end of the X-ray source of FIG. 3, through line 4—4.

A collimating slot 112 extends from the end of the drift tube 106, through the shielding material 110, transverse to the longitudinal axis L1 of the linear accelerator body 102. In the embodiment of FIG. 4, the slot 112 is centered about an axis 4—4 that is perpendicular to the longitudinal axis L1. The slot 112 is shaped to collimate the X-ray beam emitted by the target material into a desired shape, such as into a fan beam or a cone beam. The slot 112 may be formed by milling the shielding material, for example. The slot 112 may have an arc $\theta 1$ ranging from less than 1 degree to about 5 degrees to define a fan beam and ranging from about 5 degrees to about 45 degrees to define a cone beam, for example. The slot 112 may have other shapes, as well.

The electron beam 104 emitted by the linear accelerator body 102 along the longitudinal axis L1 passes through the drift tube 106 and impacts the material 108. Bremstrahlung X-ray radiation is emitted from the target material 108 in all directions. The radiation emitted in the direction of the collimating slot 112 is collimated into the desired shape and emitted from the device 100. The shielding material 110 absorbs radiation emitted in directions away from the collimating slot 112.

As mentioned above, while the radiation emitted in the forward direction has the highest intensity, the intensity drops rapidly as the angle from the forward direction increases. While the intensity of the radiation emitted perpendicular to the direction of the electron beam impacting the target material 108 is much less than the intensity of the radiation emitted in the forward direction, it is very uniform and is sufficient for scanning objects such as cargo containers and luggage.

FIG. 4 is a front, cross-sectional view of the forward end of the X-ray source 100 through the axis 4—4 in FIG. 3. The collimating slot 112 may extend over any arc $\theta 2$ up to 360 degrees, depending on the configuration of the scanning system using X-ray source 100. The linear accelerator body 102 is shown in phantom. Scanning systems using the X-ray source 100 are discussed further below.

Figure 3A:
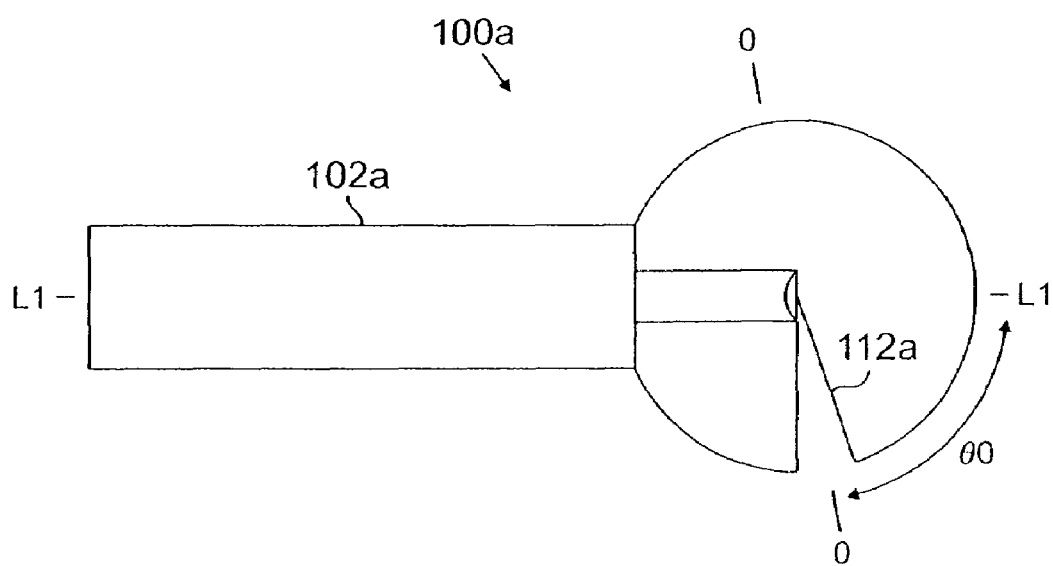
FIG. 3a is a schematic representation of a variation of the X-ray radiation source of FIG. 3.

In this embodiment, the axis 4—4 of the slot 112 is perpendicular to the longitudinal axis L1 of the X-ray source 100 (and perpendicular to the direction of the beam of electrons). The axis of the slot may be at other angles transverse to the longitudinal axis L1, as well. For example, FIG. 3a shows an X-ray source 100a where an axis O—O of a collimating slot 112a is at an oblique angle with respect to the longitudinal axis L1 of the body 102a. The angle $\theta O$ may be 80 degrees with respect to the longitudinal axis L1, for example.

While it is preferred to provide the drift tube 106 or other such passage from the output 109 of the linear accelerator body 102 to facilitate placement of shielding around the target material, that is not required. The target material 108 may be positioned at the output, as shown in FIG. 2. The shielding material 110 may then be provided forward of the output 109 and the collimating slot 112 defined through the shielding material. Additional shielding material 110 may be provided around a portion of the linear accelerator body 102 proximate the output 109, to intercept radiation emitted behind the target material 108. Additional shielding material may be provided in a scanning system incorporating such an X-ray source, as well.

Figure 5:
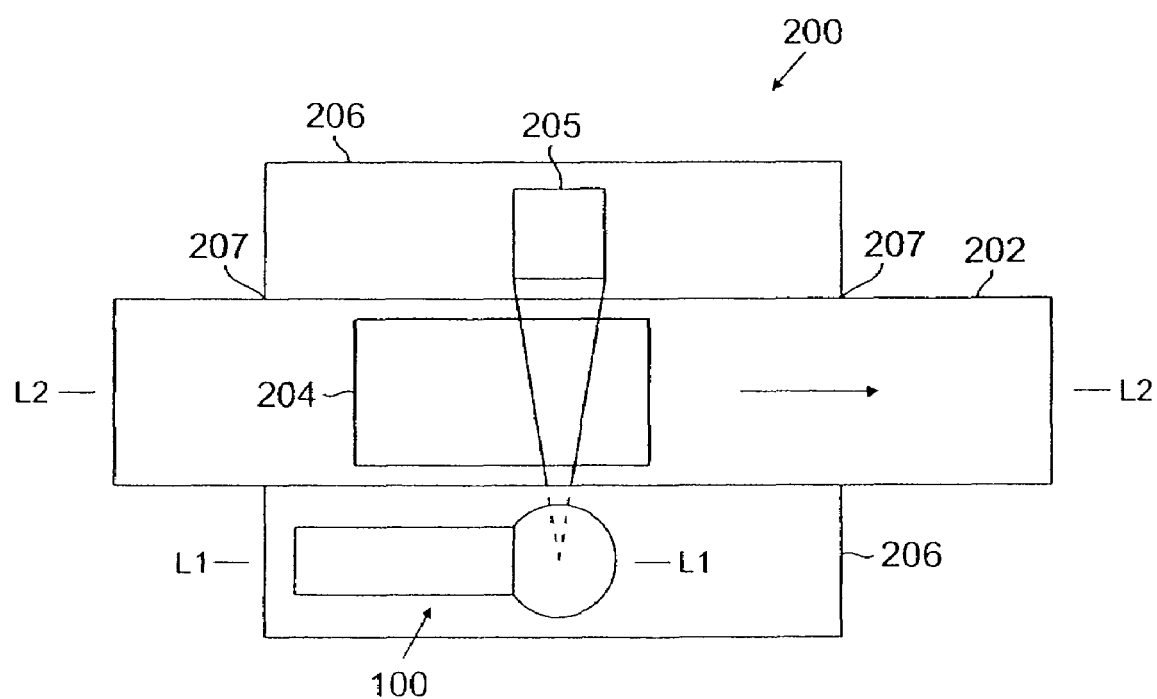
FIG. 5 is a top view of a cargo scanning system in accordance with an embodiment of the present invention, incorporating the X-ray source of FIGS. 3 and 4.

FIG. 5 is a top view of a cargo scanning system 200 in accordance with an embodiment of the present invention, incorporating the X-ray source 100 of FIGS. 3 and 4. A conveyor system 202 supports and conveys a cargo container 204 through the scanning system 200, between the X-ray source 100 and a detector 205. The conveyor system 202 may be a mechanically driven conveyor belt, a track or mechanically driven rollers, for example. The longitudinal axis L1 of the X-ray source 100 is parallel to a longitudinal axis L2 of the conveyor system 202. The collimating slot 112 of the X-ray source 100 is directed towards the cargo container 204. Shielding walls 206 surround the source 100 and the detector 205. The conveyor system 202 extends through openings 207 though the shielded walls to allow for the entry and exit of the cargo container 204.

Figure 6:
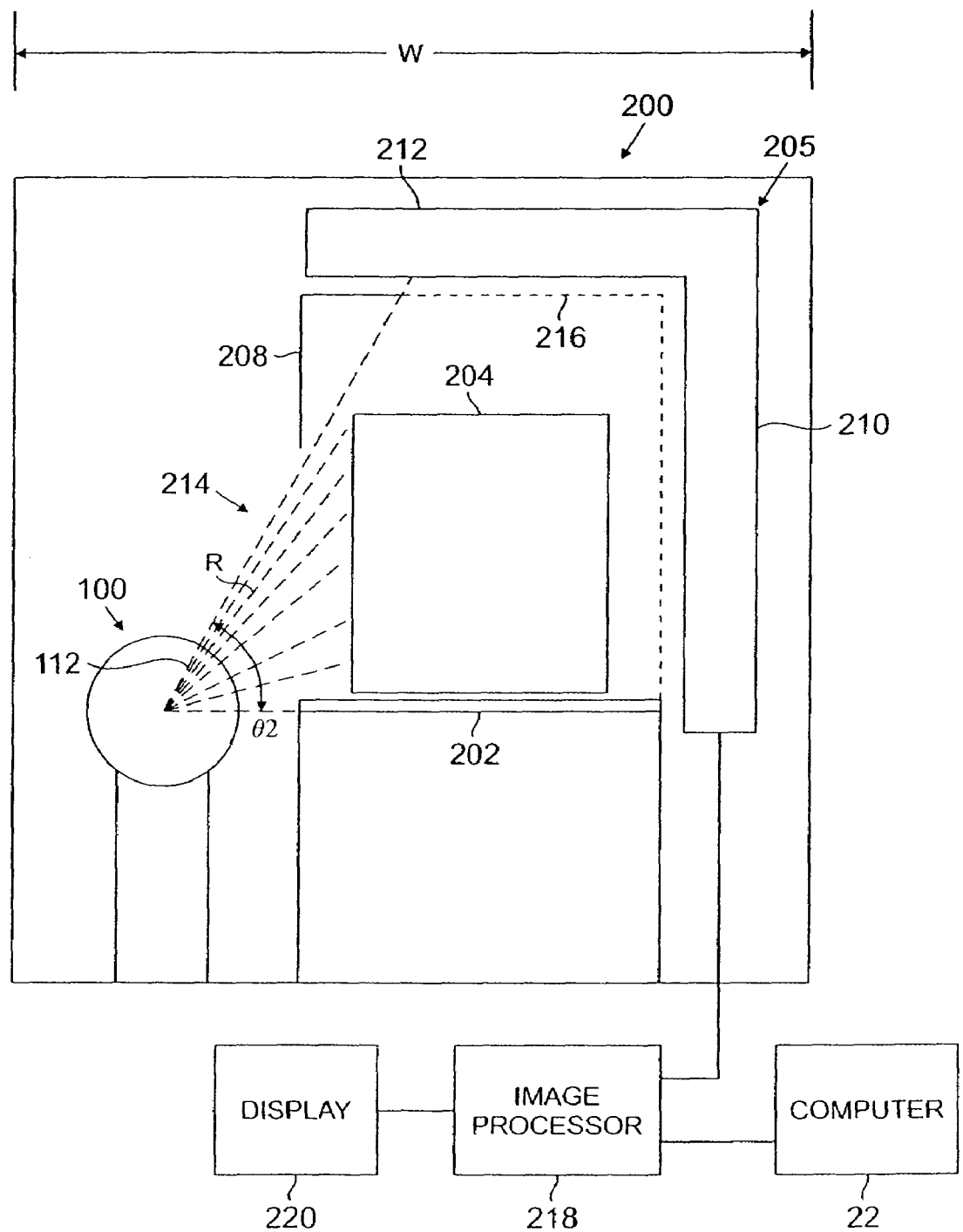
FIG. 6 is a front view of the scanning unit of FIG. 5, showing additional details of the scanning unit.

FIG. 6 is a front view of the scanning unit 200 of FIG. 5, showing additional details of the scanning unit. The cargo container 204 is conveyed by the conveyor system 202 through a shielded tunnel 208. The detector is an L-shaped detector array 205, with a first arm 210 behind the tunnel and a second arm 212 over the top of the tunnel. (In the top view of FIG. 5, the first arm 210 of the L-shaped detector array 208 and the shielded tunnel 206 are not shown to simplify the illustration.). The tunnel 206 has a first window 214 and a second window 216 to allow for the passage of an X-ray radiation beam R, as discussed above with respect to FIG. 1. The X-ray source 100 may be positioned so that the lower portion of the X-ray radiation beam is parallel to the top of the conveyor system 202. If the radiation beam R intercepts the conveyor system 202 and the conveyor system 202 is a belt or track, a material that causes low attenuation of radiation may be used. If the conveyor system 202 comprises rollers, a gap may be provided among the plurality of rollers, where necessary. A window may be provided in the structure supporting the conveyor system 202, if necessary, as well. Collimators (not shown) may be provided between the cargo container 204 and the detector array 208 to block scattered radiation from reaching the detector array 205. The conveyor system 202 may be reversed to examine a portion or the entire cargo container 204 again, or to irradiate the cargo container 204 with a different energy distribution, for example. The cargo container 204 may also be irradiated with multiple energies by rapidly cycling between two or more energy levels as the cargo container is being conveyed through the scanning unit 200.

The L-shaped detector array 205 is electrically coupled to an image processor block 218, which is coupled to a display 220. The image processor block 218 comprises analog-to-digital conversion and digital processing components, as is known in the art. A computer 222 is electrically coupled to and controls the operation of one or more of the X-ray source, the detector array, the conveyor system, the image processor and the display. The connections between the computer and all the components are not shown, to simplify the Figure. The computer may provide the processing functions of the image processor.

As shown in FIG. 6, the collimating slot 112 and the X-ray radiation beam R are directed towards the region above the conveyor system 202, to irradiate the cargo container 204. In this example, the X-ray beam 224 has an arc $\theta 2$ of about 70 degrees, which is enough to illuminate the entire cargo container 204, with a small separation between the X-ray source 100 and the cargo container. To examine a standard cargo container 204 having a height of about 8 feet (2.4 meters), the X-ray source 100 may be about 0.9 meters from the cargo container on the conveyor system 202. The length and width of the cargo container 204 will not affect the desired position of the source. The width will, however, affect the energy distribution of the X-ray source 100. In order to penetrate a standard cargo container having a width of 6–9 feet (1.8 to 2.7 meters), the energy distribution of the X-ray radiation beam R emitted by the source should be greater than about 1 MeV, as is known in the art.

Figure 1:
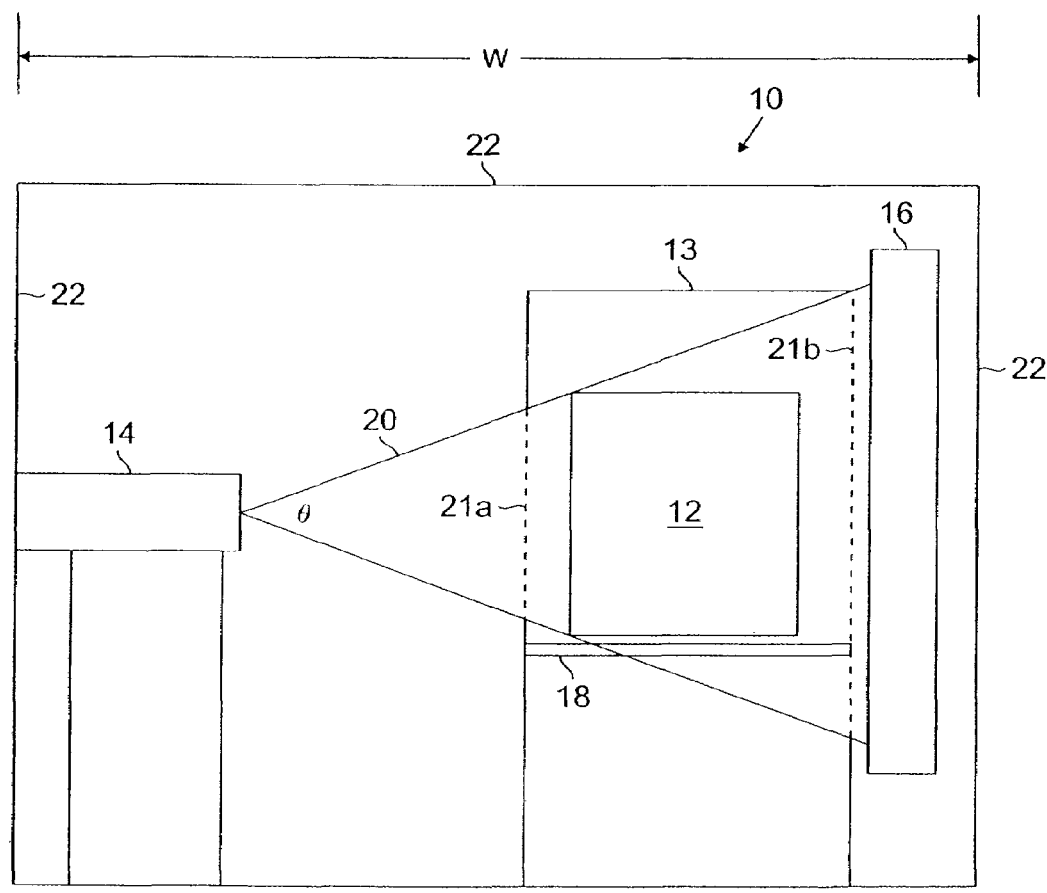
FIG. 1 is a front view of one common X-ray scanning system, referred to as a line scanner.

Since the longitudinal axis L1 of the X-ray source 100 is parallel to the longitudinal axis L2 of the conveyor system 202, the X-ray scanning unit 200 of FIGS. 5 and 6 may have a shorter width W than a corresponding X-ray scanning unit 10 of the prior art. A scanning unit 200 of the present invention may therefore be more compact and take up less space than a corresponding prior art scanning unit 10 of similar energy to scan similarly sized objects, as shown in FIG. 1.

While the size of the scanning unit is most compact when the longitudinal axis L1 of the X-ray source 100 is parallel to the longitudinal axis L2, of the conveying system 202, benefits may be obtained when the longitudinal axis L1 is at an acute angle with respect to the longitudinal axis L2. The improvements increase as the angle decreases. Significant reductions in size may be obtained when the longitudinal axis L1 is at an angle of 45 degrees or less with respect to the longitudinal axis L2. Even more of a size reduction may be obtained when the angle between the longitudinal axis L1 and the longitudinal axis L2 is 10 degrees or less. As mentioned above, the maximum improvement is obtained when L2 is parallel to L1.

Figure 7:
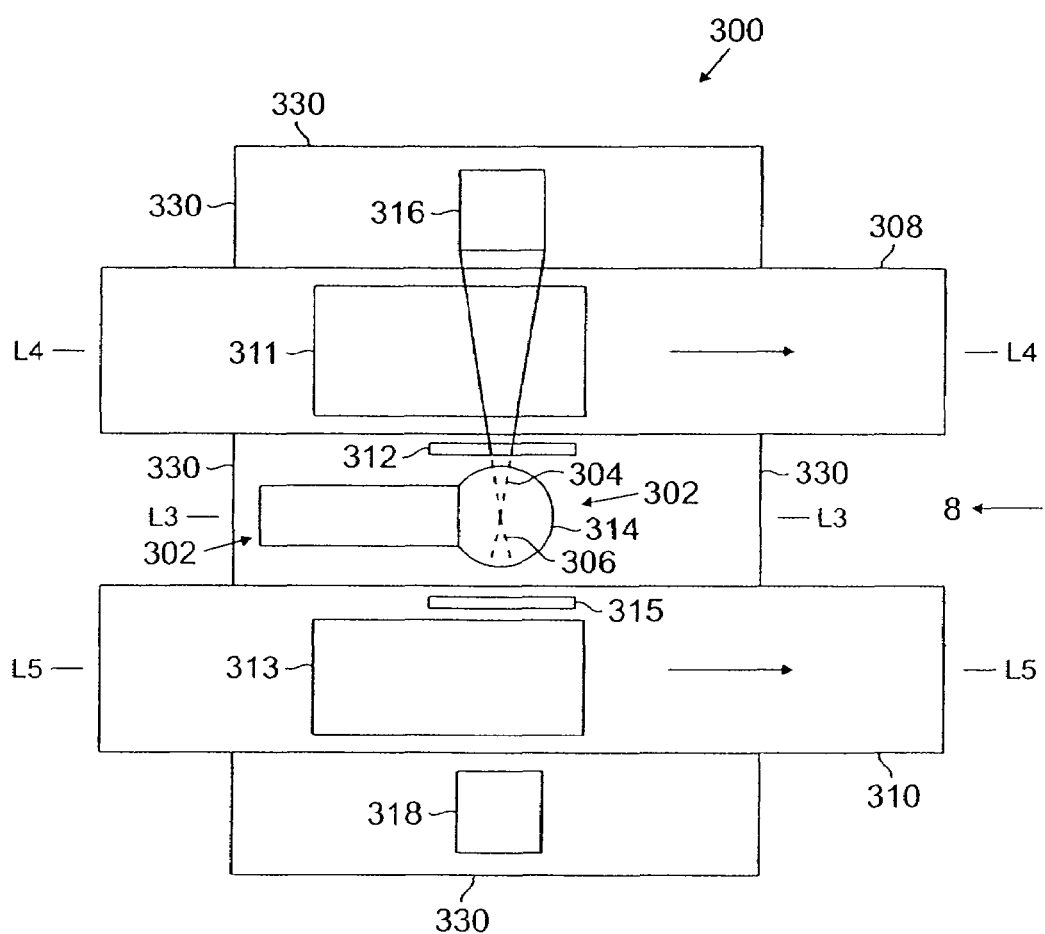
FIG. 7 is a top view of a cargo scanning unit in accordance with another embodiment of the present invention, incorporating an X-ray source having first and second collimating slots transverse to a longitudinal axis L3 of the source.

FIG. 7 is a top view of a cargo scanning unit 300 in accordance with an embodiment of the present invention, incorporating an X-ray source 302 having first and second collimating slots 304, 306 transverse to a longitudinal axis L3 of the source. The scanning unit 300 comprises first and second, parallel conveyor systems 308, 310 such as parallel conveyor belts, having parallel longitudinal axes L4, L5, respectively. One cargo container 311 is shown on the conveyor system 308 and another cargo container 313 is shown on the other conveying system 310. The conveying systems 308, 310 convey the objects 311, 313 between the X-ray source 302 and detectors 316, 318, respectively. Shielding walls surround the source 302, the detectors 316, 318 and portions of the conveying shielded target of the systems 308, 310. The conveying systems 308, 310 extend through openings in the shielding walls, to enable entry and exit of the cargo containers 311, 313. The longitudinal axis L3 of the X-ray source 302 is parallel to the longitudinal axes L4, L5 of the two conveyor systems 308, 310. The first collimating slot 304 is directed towards the region above the first conveyor system 308, and the second collimating slot 306 is directed towards the region above the second conveyor system 310.

Shutters 312, 315 of shielding material, such as lead, steel or tungsten, may be pivotally or slidably attached to the shielding material 314, the body of the X-ray source 302 or to the scanning unit 300. The shutters selectively cover one or the other collimating slot 304, 306 when a respective side of the scanning unit 300 is not being used, as shown in more detail in FIG. 8*a*. The shutters 312, 315 should be as close as possible to the focal point of electron beam on the target material 108, to minimize its size.

Figure 8:
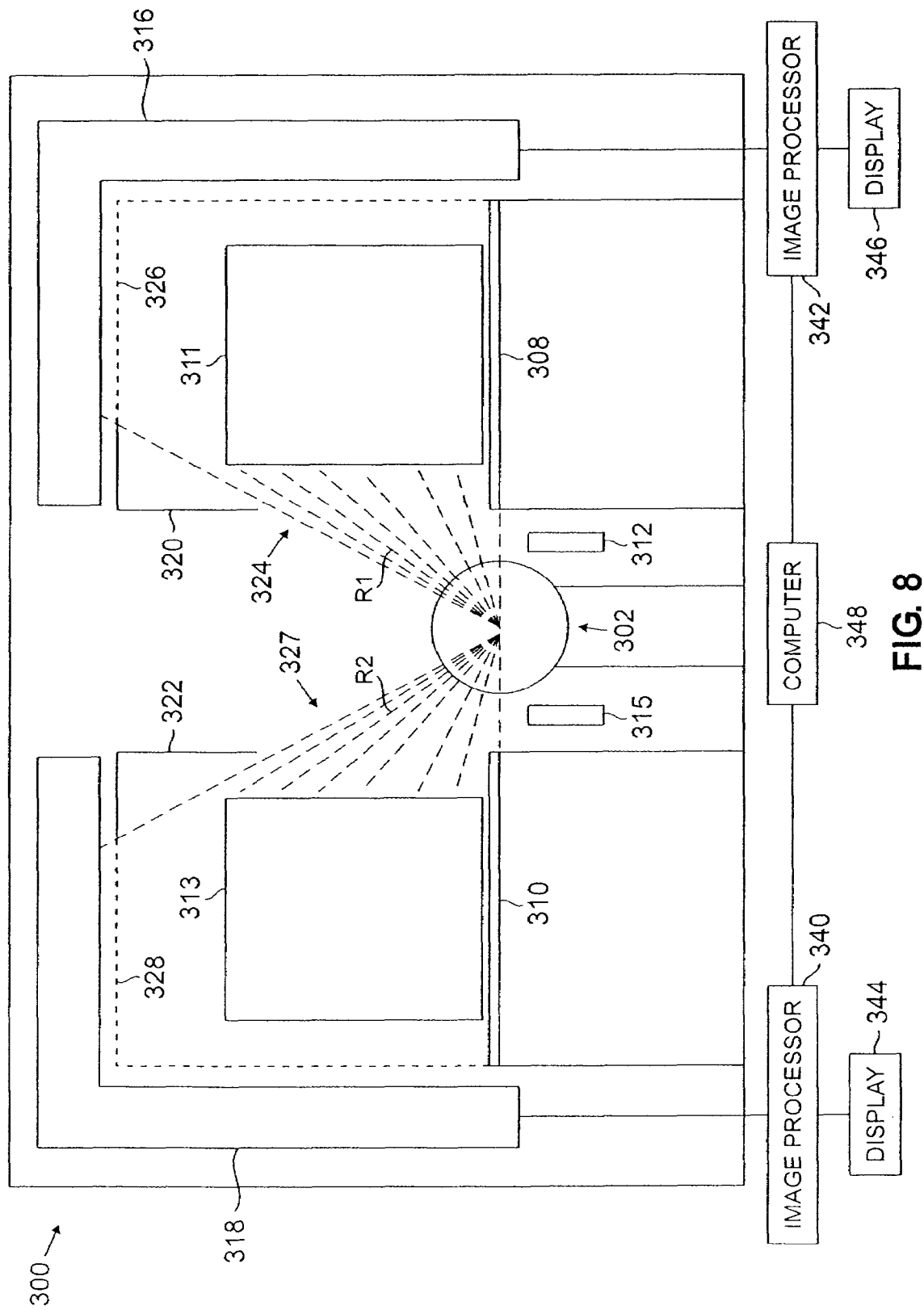
FIG. 8 is a front view of the cargo scanning unit along arrow 8 in FIG. 7.

FIG. 8 is an end view along arrow 8 in FIG. 7, showing the cargo containers 311, 313 on each conveyor system 308, 310, within shielded tunnels 320, 322, respectively. Both the shutters 312, 315 are in open positions, allowing the exit of the radiation beams from the collimating slots 302, 304. Two X-ray beams R1, R2, each being emitted by the X-ray source 100 through a collimating slot 304, 306, respectively, are shown, passing through openings 324, 327 in the tunnels 320, 322, respectively, to illuminate the cargo containers 311, 313, respectively. Each X-ray beam R1, R2 has an arc of about 70 degrees, as in the embodiment of FIG. 6, to fully illuminate the cargo container 311, 313.

Figure 8A:
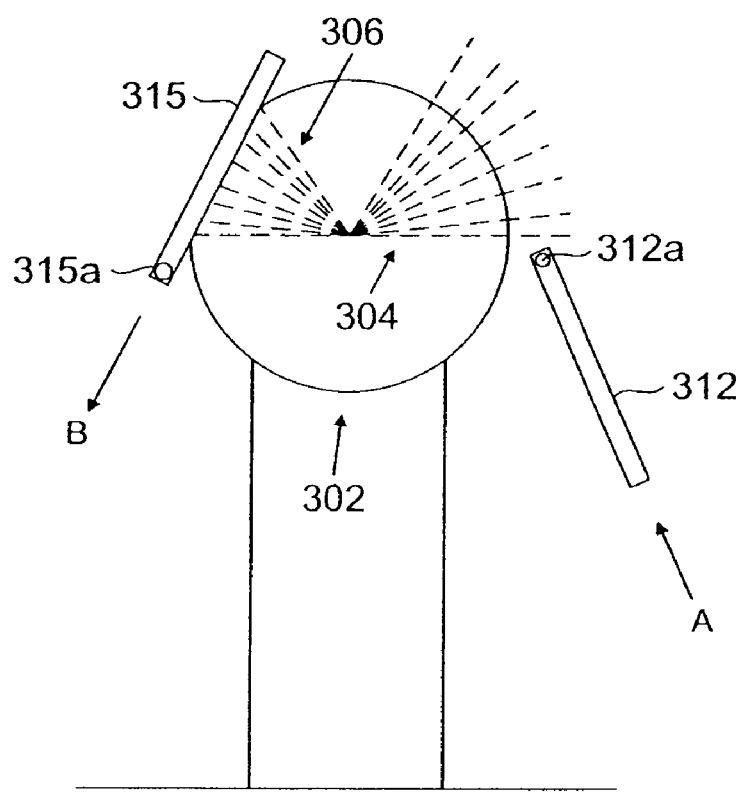
FIG. 8a is a front view of the cargo scanning system of FIG. 8, slowing the X-ray source and the shutters in more detail.

FIG. 8*a* is a more detailed front view of the X-ray source 302 and the two shutters 312, 315. Here, the shutters 312, 315 are pivotally attached to the source 302 or to the scanning unit 300 at respective points 312*a*, 315*a*. The shutter 312 is an open position, so that radiation may be emitted from the collimating slot 304. The shutter 315 is in a closed position, blocking the emission of radiation from the collimating slot 306. To close the collimating slot 304, the shutter 312 may be rotated about the pivot 312*a*. Similarly, to open the collimating slot 306, the shutter 315*a* may be rotated about the pivot point 315*a*. A mechanism (not shown) may be coupled to the shutters 312, 315 to cause rotation. The mechanism may be controlled by the computer controlling operation of the system 300, under the control of the user. As mentioned above, the shutters 312, 315 may also be moved along a rail in the direction of arrows A, B, respectively, to slide the shutters into and out of position to open and close each collimating slot 304, 315, respectively, by a suitable mechanism. As discussed above, both collimating slots 304, 306 may be open at the same time to concurrently examine cargo containers on different conveyor systems.

As above, the detectors 316, 318 are L-shaped. Openings 326, 328 are also provided in the far sides of the shielded tunnels 320, 322 to allow for passage of the radiation from the cargo containers 311, 313 to the detectors 316, 318. Two image processors 340, 342 are electrically coupled to the detectors 316, 318 respectively. Two displays 344, 346 are electrically coupled to the image processors 340, 342, respectively. A computer 348 controls operation of the scanning unit 300. The cargo scanning unit 300 can examine twice as many cargo containers using a single X-ray device 302, as in the embodiment of FIG. 6.

Figure 9:
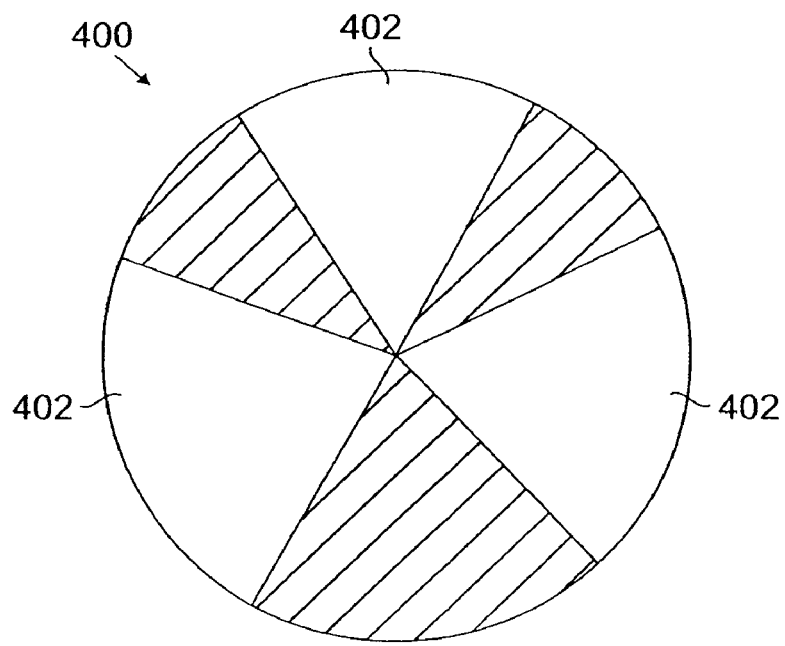
FIGS. 9 and 10 are cross-sectional views of shielded targets including three collimating slots and four collimating slots in accordance with the invention, respectively.
Figure 10:
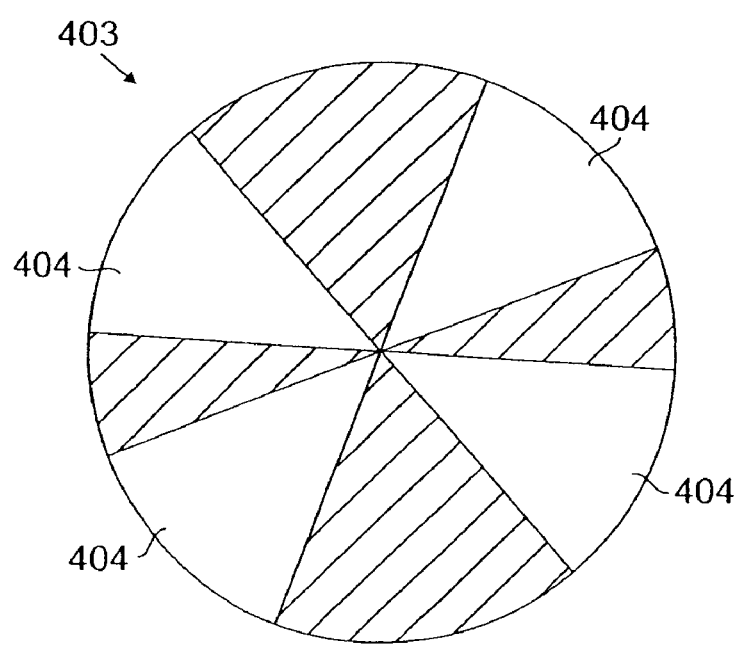
Figure 11:
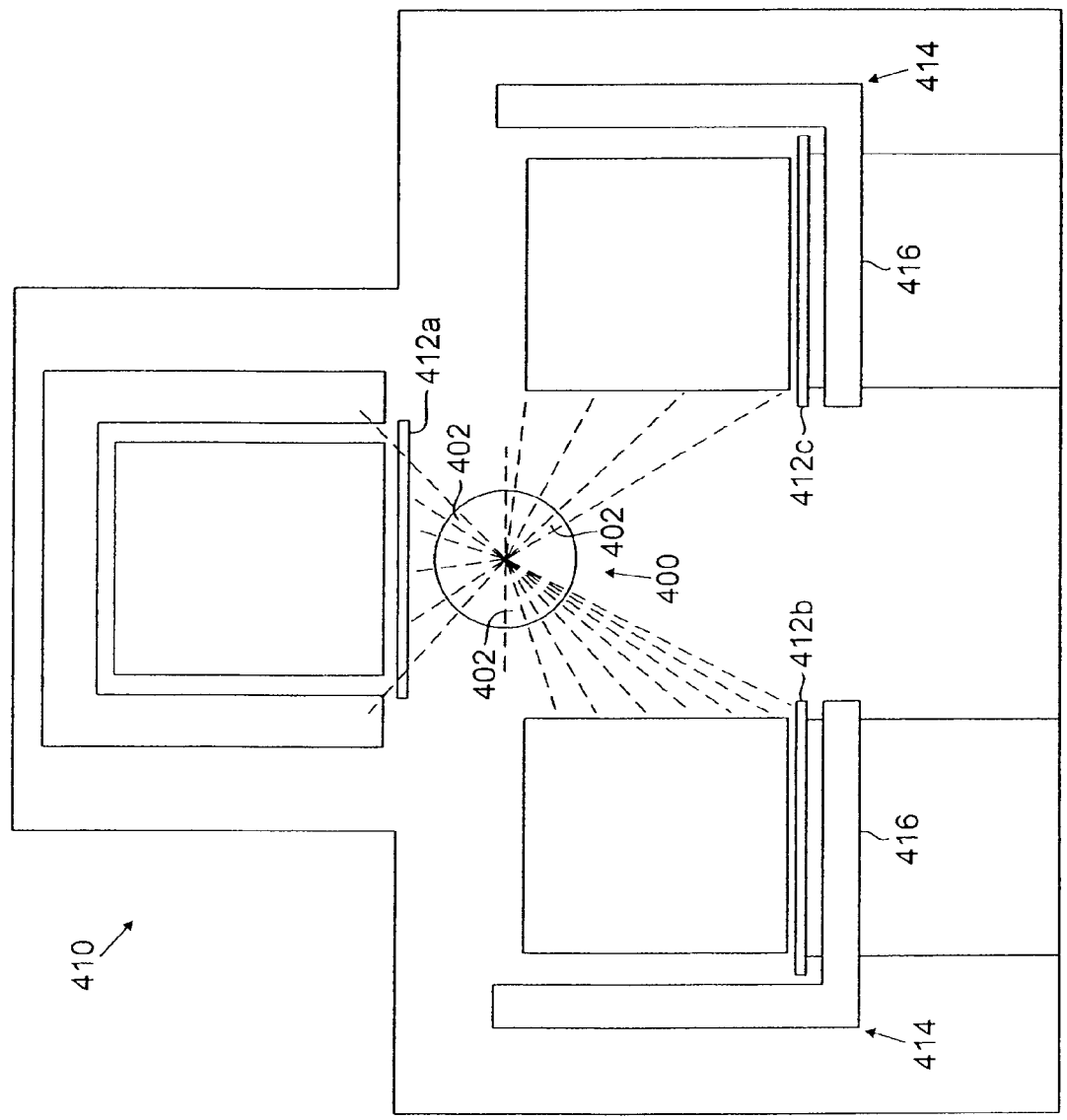
FIGS. 11 and 12 are front views of X-ray scanning units comprising X-ray sources with the shielded targets of FIGS. 9 and 10, respectively.
Figure 12:
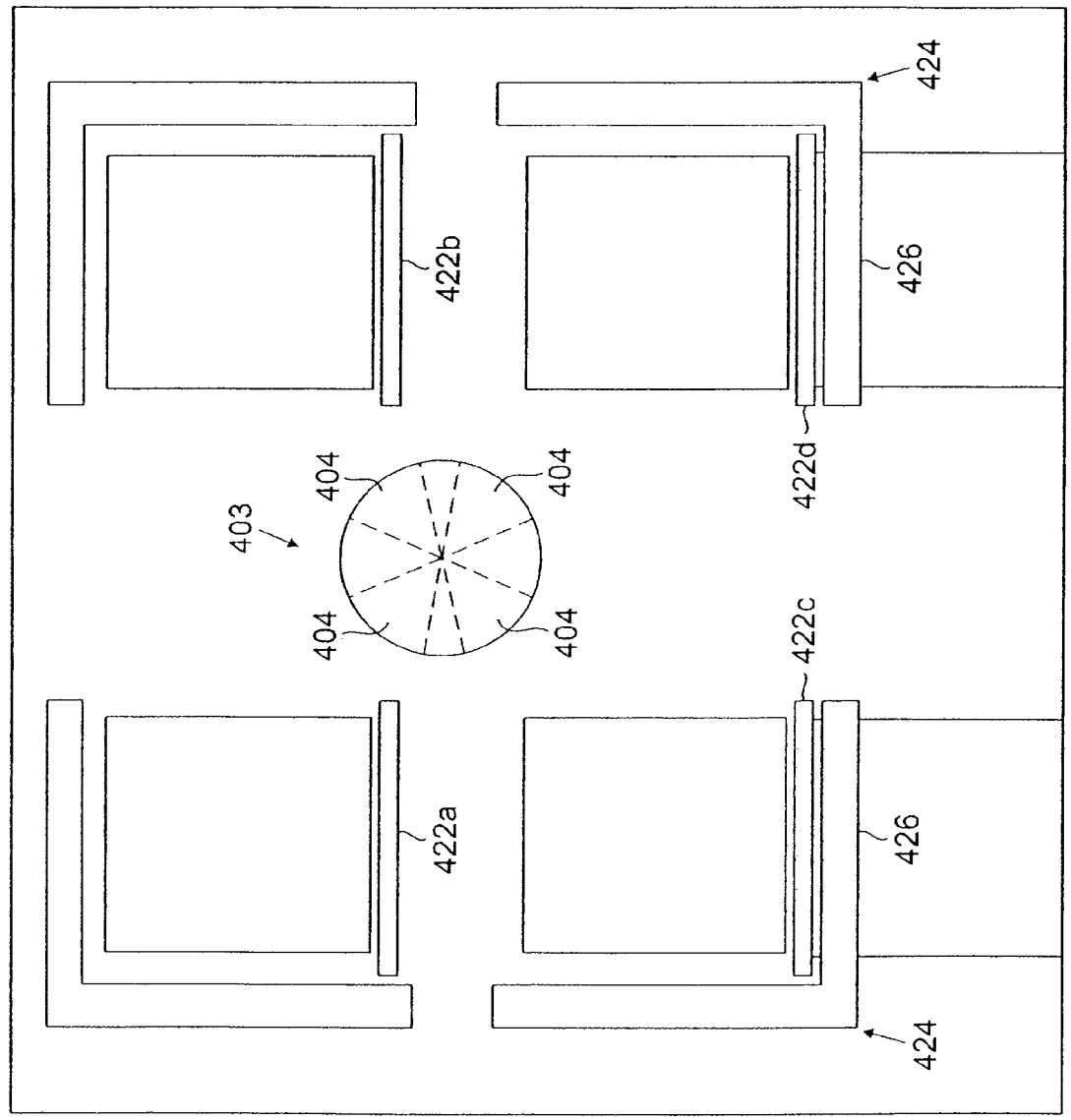

To further increase number of cargo containers that can be examined at one time, three collimating slots 402 or four collimating slots 404 may also be provided in the shielded target material of the X-ray source 100 (FIG. 3), as shown in the cross-sectional views of the shielded targets 400, 403 in FIGS. 9 and 10, respectively. X-ray scanning units 410, 420 comprising three conveyor systems 412*a*, 412*b*, 412*c* or four conveyor systems, 422*a*, 422*b*, 422*c*, 422*d*, respectively, may be constructed with the X-ray source of FIGS. 9 and 10, as shown in the front views of FIGS. 11 and 12, respectively.

In these embodiments, the longitudinal axes of the X-ray sources 400, 403 and the three conveying systems 412*a*, 412*b*, 412*c* or the four conveying systems 422*a*, 422*b*, 422*c*, 422*d* are parallel. The arc of the beams emitted from each slot depends on the configuration of the system. The sum of the arcs of the beams cannot exceed 360 degrees. The arc of each beam in the three conveyor system 410 may be about 90 degrees to about 110 degrees, for example. The arc of each beam in the four conveyor system 410 may be about 75 degrees to about 90 degrees, for example.

The arc of each beam need not be the same. For example, if each conveyor system is meant to handle different sized objects, the arcs of the respective beams directed to each conveyor system may be different. In addition, the axes of each of the slots need not be at the same angle with respect to the longitudinal axis of the X-ray source. For example, certain of the axes may be perpendicular and others at some other transverse angle. It is also noted that a single collimating slot extending 360 degrees may be used to illuminate cargo containers on all of the conveying systems, if desired. Extra shielding may then be provided in the scanning system, if needed.

As above, mechanical shutters (not shown) may be provided to cover one or more of the collimating slots, as desired or required. Supporting structures for the source and the upper conveying systems, which are not shown to simplify the figures, may be readily provided by one of ordinary skill in the art.

It is noted that in the lower sections of the scanning units 410, 420, the L-shaped detectors 414, 424 have arm portions 416, 426 below the respective conveying systems 412*b*, 412*c*, 422*c*, 422*d*.

Separate image processor blocks and displays (not shown) may be provided for each conveying system in each scanning unit 410, 420. Each scanning unit 410, 420 may be controlled by a single computer, also not shown. Other elements are common to the scanning unit 200 of FIGS. 5 and 6 and are not further discussed.

Figure 13:
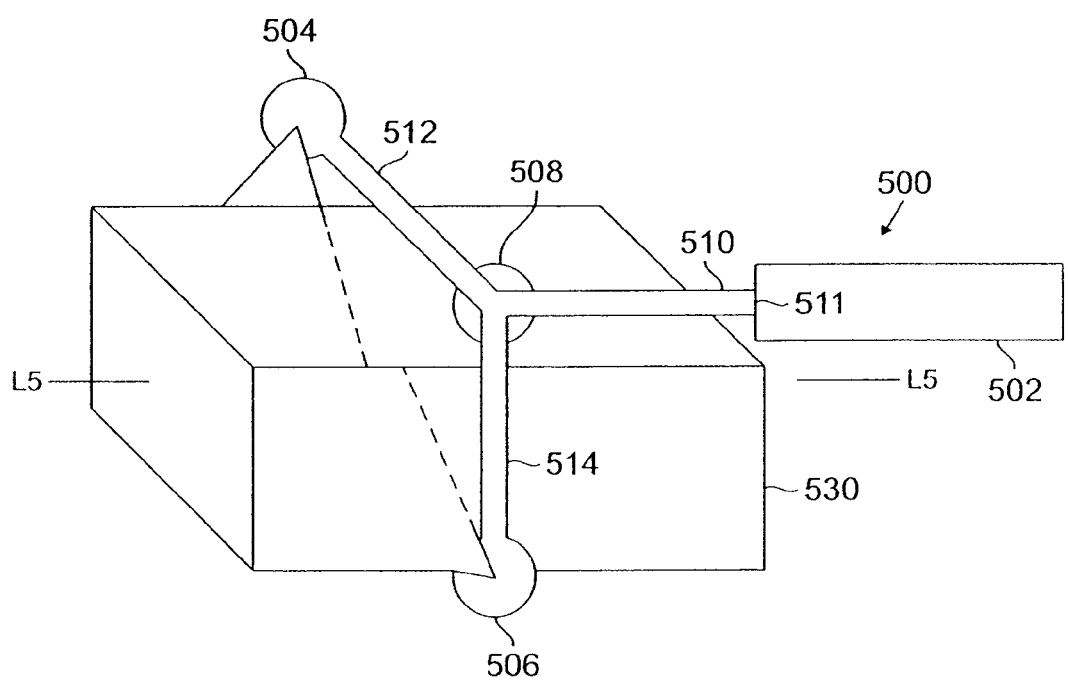
FIG. 13 is a perspective view of an X-ray source in accordance with another embodiment of the invention, where an electron beam from a linear accelerator body is selectively directed to one of two shielded targets by an electromagnetic bend magnet.

FIG. 13 is a perspective view of an X-ray source 500 in accordance with another embodiment of the invention, where an electron beam from a linear accelerator body 502 is selectively directed to one of two shielded targets 504, 506 by an electromagnetic bend magnet 508. A first drift tube 510 extends from the output end 511 of the linear accelerator body 502 to the bend magnet 508. Two drift tubes 512, 514 extend at right angles from the bend magnet 508, to the two shielded targets 504, 506. The structure of the shielded targets 504, 506 may be the same as the structure of the shielded target of FIG. 3. The shielding material 520 in each shielded target has a collimating slot 522 defined therein, as described above.

The two shielded targets 504, 506 are shown irradiating two perpendicular sides of a cargo container 530. The remainder of the scanning unit, which may be the same as in the scanning unit of FIGS. 5 and 6, is not shown. In this embodiment, the shielded targets 504, 506 are positioned so that the X-ray beams emitted by the shielded targets irradiate different slices of the cargo container 530 in different parallel planes along the longitudinal axis L5 of the cargo container 530. This facilitates placement of the detectors (not shown) to receive X-ray radiation transmitted through the cargo container 530, but is not required. The detectors may be L-shaped detectors, as above. In operation, the electromagnetic bend magnet, which is a well known device, is used to alternately deflect the electron beam into one or the other tube as the object is conveyed through the scanning unit.

Figure 14:
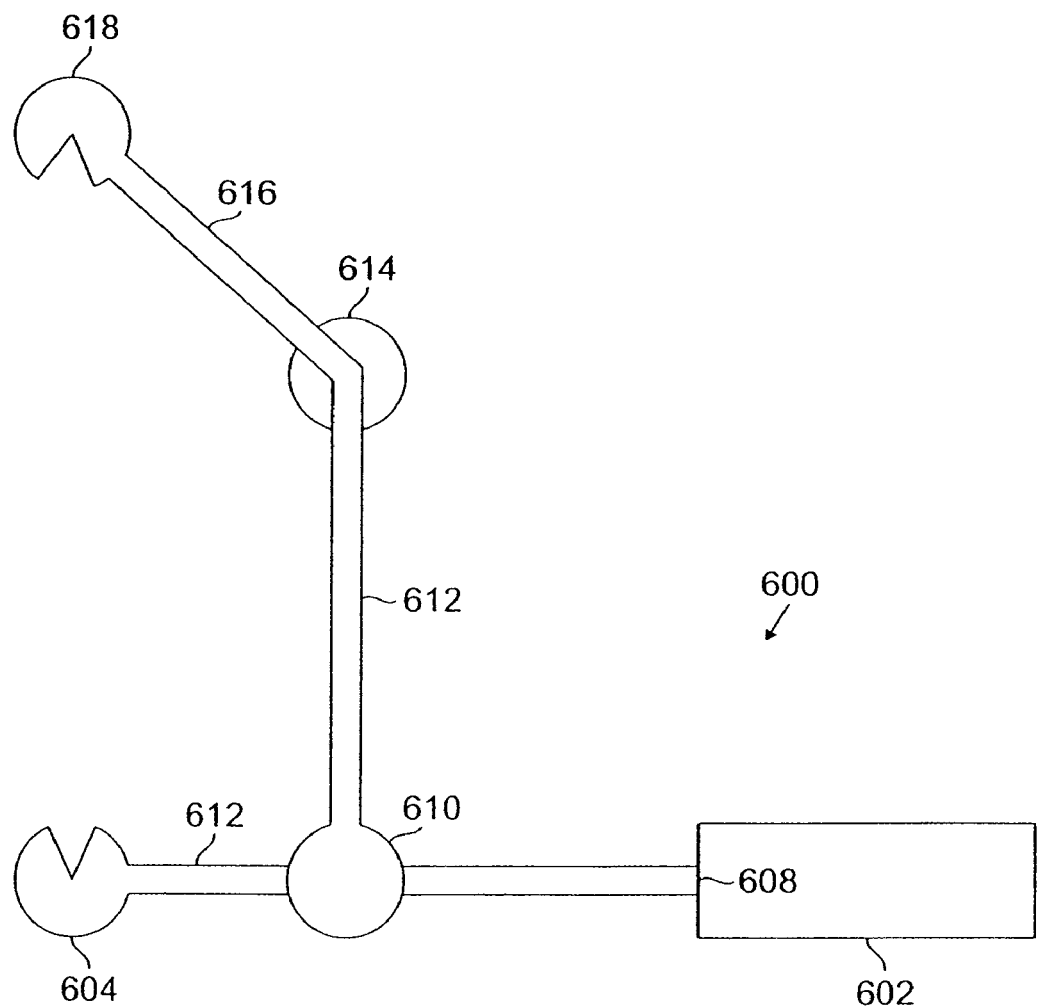
FIG. 14 is a perspective view of an X-ray source in accordance with the embodiment of FIG. 13, wherein the linear accelerator body is aligned with one of the shielded targets.

Depending on space constraints in the configuration of the scanning unit, it may be advantageous to align the linear accelerator body 502 with one of the shielded targets. FIG. 14 is a perspective view of an X-ray source 600, comprising a linear accelerator body 602 is aligned with a first shielded target 604. A first drift tube 606 couples the open end 608 of the linear accelerator body 602 to a first bend magnet 610. A second drift tube 612 couples the first bend magnet 610 to the first shielded target 604. A third drift tube 612 couples the first bend magnet 610 to a second bend magnet 614. A fourth drift tube 616 couples the second bend magnet 614 to a second shielded target 618. The first bend magnet 614 selectively allows the electron beam to pass to the first shielded target 604 or deflects the electron beam to the second shielded target 618. The first bend magnet is an electromagnet. In this case, the second bend magnet 614, which may always be on, may be a permanent magnet or an electromagnet. The configurations of the first and second shielded targets 604, 618 may be same as the shielded target in the embodiment of FIG. 3.

The configuration of the detector or detector array may depend on the shape of the collimated radiation beam. For example, if the radiation beam is collimated into a fan beam, a one-dimensional detector array may be provided. A one dimensional detector array may comprise a single row of detector elements. If the collimated radiation beam is a cone beam, such as an asymmetric pyramidal cone beam, the detector array may be a two dimensional detector or detector comprising two or more adjacent rows of detector elements. The detector array may comprise a plurality of modules of detectors, each comprising one or more rows of detector elements supported in a housing.

The L-shaped detector arrays may comprise conventional detectors. For example, the detectors may be a scintillator coupled to discrete photodiodes. The detectors may also comprise a scintillator coupled to a photomultiplier tube, for example, as is known in the art. X-ray photons impinging upon the scintillator cause the emission of light photons energies proportional to the energy of the X-ray photons. The light photons are detected by the photomultiplier tube, whose output is proportional to the energy of the detected light photons. A scintillator based detector may be particularly useful if the X-ray source selectively emits radiation having multiple energy distributions. The scintillator may be a cesium iodide scintillator, for example. Pulse Height Analysis ("PHA") may be used to analyze the data from the detectors. The detector may also be amorphous silicon detectors available from Varian Medical Systems, Inc., Palo Alto, Calif., for example.

Detectors may be positioned between the X-ray source and the cargo container to detect radiation scattered by the cargo container, in addition to or instead of detecting transmitted radiation.

While the X-ray sources described above comprise from one (1) to four (4) collimating slots to form one (1) to four (4) radiation beams, additional collimating slots may be provided to form additional radiation beams. In any of the X-ray sources, the collimating slots may have the same or different arcs and define either fan beams or cone beams, or both in the same source. In addition, the transverse angle between the axis of each slot and the longitudinal axis of the X-ray source or the path of the electrons may be the same or different.

The use of the term cargo container, above, encompasses pallets, which are comparably sized. In addition, while the scanning units described above are described as cargo scanning units to examine cargo containers, the scanning units may be used to examine other objects, such as luggage, bags, briefcases and the like.

In addition, while the X-ray sources described above use a linear accelerator body as a source of high energy electrons, the X-ray source may use an X-ray tube or other such device, as well.

One of ordinary skill in the art will recognize that other changes may be made to the embodiments described herein without departing from the scope of the invention, which is defined by the claims, below.

I claim:

1. An X-ray source comprising:
a housing defining a chamber to accelerate electrons and an output of the chamber, the chamber having a first longitudinal axis, wherein the output is aligned with the first longitudinal axis to allow passage of accelerated electrons from the chamber;
a tube defining a passage having a second longitudinal axis, the tube having a proximal end coupled to the output of the housing such that the second longitudinal axis is aligned with the first longitudinal axis and accelerated electrons can enter the passage;
a target material within the tube, wherein impact of the target material by accelerated electrons causes generation of X-ray radiation; and
non-rotatable shielding material around at least a portion of the tube around the target, the shielding material defining a slot therethrough to allow passage of generated radiation during operation;
wherein the slot is centered about an axis transverse to the first and second longitudinal axes.

2. The X-ray source of claim 1, further comprising a source of electrons to emit electrons into the chamber, along the first longitudinal axis, the source being supported by the housing.

3. The X-ray source of claim 2, wherein;
the housing defines an input opening to the chamber; and
the source of electrons is coupled to the input opening.

4. The X-ray source of claim 1, wherein the target is at the distal end of the tube.

5. The X-ray source of claim 1, wherein the shielding material surrounds the entire tube and a portion of the housing proximate the tube.

6. The X-ray source of claim 1, wherein the axis of the slot forms an angle with the first and second axes of from 80 to 90 degrees.

7. The X-ray source of claim 1, wherein the slot defines a fan beam or a cone beam.

8. The X-ray source of claim 1, wherein the shielding material defines a plurality of slots extending from the target to the exterior surface of the shielding material, the slots being transverse to the first and second axes.

9. The X-ray source of claim 8, wherein at least some of the slots have a respective axis perpendicular to the first and second axes.

10. The X-ray source of claim 8, further comprising a respective shutter coupled to the housing adjacent to at least some of the slots to selectively open and close those slots.

11. The X-ray source of claim 1, further comprising:
a bend magnet;
a second tube coupling the bend magnet to the output of the housing, wherein the proximal end of the first tube is coupled to the output of the housing by the bend magnet and the second tube;
a third tube having a first end coupled to the bend magnet;
a second target material within the third tube; and
shielding material around at least a portion of the third tube surrounding the target material;

whereby electrons exiting the housing are selectively directed through the first or third tube, to the first or second target, respectively, by the bend magnet.

12. The X-ray source of claim 11, wherein the bend magnet is an electromagnet.

13. The X-ray source of claim 11, further comprising:
a second bend magnet; and
a fourth tube coupling the first bend magnet to the second bend magnet;
wherein:
the third tube is coupled to the first bend magnet through the fourth tube and the second bend magnet; and
the second tube, the bend magnet and the first target are aligned along the first and second longitudinal axes.

14. The X-ray source of claim 1, wherein the target is a refractory metal.

15. The X-ray source of claim 1, wherein the target is tungsten.

16. The X-ray source of claim 1, wherein the shielding material is chosen from the group consisting of tungsten, steel and lead.

17. The X-ray source of claim 1, wherein the housing defines a linear accelerator.

18. The X-ray source of claim 17, wherein the linear accelerator accelerates electrons to a selected one of a plurality of energies.

19. The X-ray source of claim 1, wherein:
the chamber is adapted to accelerate electrons such that impact of the target material by accelerated electrons causes generation of X-ray radiation having a peak energy of at least 1 MeV.

20. The X-ray source of claim 1, wherein:
the slot extends from proximate the target to an exterior surface of the shielding material.

21. An X-ray source comprising:
a linear accelerator defining a chamber to accelerate electrons and an output of the chamber, the chamber having a first longitudinal axis, wherein the output is aligned with the first longitudinal axis to allow passage of accelerated electrons from the chamber;
a source of electrons associated with the chamber to emit electrons along the first longitudinal axis;
a tube defining a passage having a second longitudinal axis, the tube having a proximal end with an input coupled to the output of the housing such that the second longitudinal axis is aligned with the first longitudinal axis and accelerated electrons can enter the passage;
a target material of refractory metal at the distal end of the tube, along the second longitudinal axis, wherein impact of the target material by electrons causes generation of X-ray radiation; and
shielding material around at least a portion of the tube around the target, the shielding material defining a slot, therethrough to allow passage of generated radiation resulting from impact of the emitted electrons on the target, during operation; wherein
the slot being centered about an axis forming an angle with the first and second longitudinal axes within a range of 90 degrees plus or minus 10 degrees; and
the slot extending only partially around the second longitudinal axis.

22. The X-ray source of claim 21, wherein the shielding material defines a plurality of slots extending from the target to the exterior surface of the shielding material, each of the plurality of slots forming respective angles with the first and second axes within a range of 90 degrees plus or minus 10 degrees.

23. The X-ray source of claim 21, wherein;
the slot extends up to 110 degrees around the second longitudinal axis.

24. The X-ray source of claim 21, wherein:
the slot extends from proximate the target to an exterior surface of the shielding material.

25. An X-ray source, comprising:
a source of high energy electrons, wherein the high energy electrons travel along a longitudinal path;
a target material lying along the longitudinal path of the high energy electrons, the target material generating X-ray radiation due to impact of the high energy electrons with the target; and
non-rotatable shielding material around at least a portion of the target, the shielding material defining a slot therethrough to allow passage of radiation resulting from impact of the high energy electrons on the target, during operation;
wherein:
the slot is centered about an axis transverse to the longitudinal path; and
the slot extends only partially around the longitudinal path.

26. The X-ray source of claim 25, wherein the axis of the slot forms an angle with the longitudinal path within a range of 90 degrees plus or minus 10 degrees.

27. The X-ray source of claim 25, wherein the shielding material defines a plurality of slots extending from the target to an exterior surface of the shielding material.

28. The X-ray source of claim 27, wherein the axis of each of the plurality of slots forms respective angles with the longitudinal path of within a range of 90 degrees plus or minus 10 degrees.

29. The X-ray source of claim 25, wherein the source of high energy electrons comprises:
a source of electrons; and
an accelerating chamber to receive electrons from the source and to accelerate the electrons.

30. The X-ray source of claim 29, wherein the accelerating chamber is a linear accelerator.

31. The X-ray source of claim 25, wherein the shielding material is around a portion of the path to the target.

32. The X-ray source of claim 31, wherein the path extends, at least in part, through the source of high energy electrons.

33. The X-ray source of claim 32, wherein the shielding material is around at least a portion of the source of high energy electrons.

34. The X-ray source of claim 25, wherein the path is defined in part by a tube extending from the source of high energy electrons, wherein the shielding material is around at least a portion of the tube.

35. The X-ray source of claim 25, wherein;
the slot extends up to 110 degrees around the second longitudinal axis.

36. The X-ray source of claim 35, wherein;
the slot extends up to 90 degrees around the second longitudinal axis.

37. A system for examining an object, comprising:
a conveyor system to move the object through the system along a longitudinal axis; and
a source of radiation comprising:
a source of high energy electrons, wherein the high energy electrons travel along a longitudinal path;

a target material lying along the longitudinal path of the high energy electrons, the target material generating radiation due to impact of the high energy electrons with the target; and non-rotatable shielding material around at least a portion of the target, the shielding material defining a slot therethrough to allow passage of generated radiation, during operation;

wherein:
the slot is centered about an axis transverse to the longitudinal path; and
the radiation source is positioned with respect to the conveying system such that radiation emitted through the slot will irradiate an object for inspection on the conveying system.

38. The scanning system of claim 37, wherein the radiation source is on a first side of the conveying system, the system further comprising:
a detector on a second side of the conveying system, to detect radiation transmitted through the object.

39. The scanning system of claim 37, wherein the source of radiation is a source of X-ray radiation.

40. The scanning system of claim 37, wherein the radiation source has a longitudinal axis and the longitudinal path and the longitudinal axis form an acute angle.

41. The scanning system of claim 40, wherein the acute angle is less than or equal to 45 degrees.

42. The scanning system of claim 41, wherein the acute angle is less than or equal to 10 degrees.

43. The scanning system of claim 37, wherein the radiation source has a longitudinal axis and the longitudinal path and the longitudinal axis are parallel.

44. The scanning system of claim 37, wherein the shielding material further defines a second slot centered about a second axis transverse to the longitudinal path to emit generated radiation;
the scanning system further comprising:
a second conveying system to move an object through the system along a second longitudinal axis parallel to the first longitudinal axis, wherein the second slot is positioned to emit generated radiation to irradiate an object on the second conveying system.

45. The scanning system of claim 44, further comprising:
first and second shutters mechanically coupled to the system proximate the first and second slots, respectively, to selectively open and close the respective slot.

46. The scanning system of claim 44, wherein the shielding material further defines a third slot centered about a third axis transverse to the longitudinal path to emit generated radiation;
the scanning system further comprising:
a third conveying system to move an object through the system along a third longitudinal axis parallel to the first longitudinal axis, wherein the third slot is positioned to emit generated radiation to irradiate an object on the third conveying system.

47. The scanning system of claim 46, wherein the shielding material defines a fourth slot centered about a fourth axis transverse to the longitudinal path to emit generated radiation;
the scanning system further comprising:
a fourth conveying system to move an object through the system along a fourth longitudinal axis parallel to the first longitudinal axis, wherein the fourth slot is positioned to emit generated radiation to irradiate an object on the fourth conveying system.

48. The scanning system of claim 37, wherein the axis of the slot forms an angle with the longitudinal path within a range of 90 degrees plus or minus 10 degrees.

49. A scanning system to examine objects, comprising:
a conveyor system to move the object through the system along a longitudinal axis;
a source of high energy electrons to emit electrons along a path;
a bend magnet along the path;
a first target material, the target material generating X-ray radiation due to impact of the high energy electrons with the target; and
first shielding material around the first target material, the shielding material defining a first slot therethrough, the first slot being centered about an axis transverse to the path;
a second target material, the target material generating X-ray radiation due to impact of the high energy electrons with the target; and
second shielding material around the second target material, the second shielding material defining a second slot therethrough, the second slot being centered about an axis transverse to the path;
wherein:
the bend magnet is capable of selectively directing the high energy electrons to the first or the second target; and
the first slot and the second slot are positioned with respect to the first conveying system to allow passage of generated radiation to irradiate different sides of the object on the conveying system, during operation.

50. The scanning system of claim 49, wherein the first target and the first bend magnet are aligned with the path, the system further comprising:
a second bend magnet, wherein the first bend magnet is capable of selectively directing the high energy electrons to the first target or the second bend magnet, the second bend magnet capable of directing the high speed electrons to the second target.

51. An X-ray scanning system to examine an object, comprising:
a conveyor system to move the object through the system along a first longitudinal axis; and
an elongated X-ray source configured to emit X-ray radiation with a peak energy of at least 1 MeV, during operation, the X-ray source having a second longitudinal axis and comprising a source of charged particles and a target, wherein the source of charged particles and the target lie along the second longitudinal axis and the charged particles travel from the source of charged particles to the target, along the second longitudinal axis;
wherein the X-ray source is supported adjacent to the conveying system such that the first longitudinal axis is parallel to the second longitudinal axis.

52. The X-ray scanning system of claim 51, wherein the X-ray source is on a first side of the conveying system, the system further comprising:
a detector on a second side of the conveying system, to detect X-ray radiation transmitted through the object.

53. The X-ray scanning system of claim 51, wherein:
the source of charged particles comprises a source of high energy electrons; and
shielding material around at least a portion of the target, the shielding material defining a slot therethrough to emit generated radiation;

wherein:
the slot is centered about an axis transverse to the longitudinal axis; and
the source is positioned with respect to the conveying system such that radiation emitted through the slot will irradiate an object for inspection on the conveying system.

54. The X-ray scanning system of claim 53, wherein the shielding material defines a plurality of slots to emit generated radiation, wherein each slot is centered about an axis transverse to the longitudinal path.

55. The X-ray scanning system of claim 53, wherein:
the axis of the slot is perpendicular to the longitudinal axis.

56. The X-ray scanning system of claim 51, wherein:
the X-ray source further comprises a tube defining a passage along the second longitudinal axis; and
the target is within the tube.

57. A method of generating X-ray radiation, comprising:
colliding high energy electrons traveling along only a single axis with a target, the target being surrounded radially with respect to the axis by non-rotating shielding material, to generate radiation; and
collimating the generated radiation into a radiation beam in a direction transverse to the axis and extending only partially around the axis by a slot through the shielding material.

58. The method of claim 57, wherein the high energy electrons are formed by accelerating electrons through a chamber.

59. The method of claim 58, wherein the chamber has an outlet lying along the longitudinal path, the method comprising:
colliding the accelerated electrons with a target displaced from the outlet of the chamber.

60. The method of claim 57, comprising collimating the radiation emitted from the target into a radiation beam forming an angle with the axis within a range of 90 degrees plus or minus 10 degrees.

61. The method of claim 57, comprising collimating the radiation emitted from the target into a plurality of radiation beams, each beam being transverse to the longitudinal path.

62. The method of claim 57, comprising:
collimating the generated radiation by a slot transverse to the axis.

63. The method of claim 57, comprising:
colliding high energy electrons, having a peak energy of at least 1 MeV, with the target.

64. A method of examining contents of an object with a radiation source, the method comprising:
colliding high energy electrons traveling along a longitudinal path from a source to a point target along the path, the target being surrounded by non-rotating shielding material, to generate radiation;
collimating the generated radiation into at least one radiation beam transverse to the longitudinal path by at least one respective slot through the shielding material, wherein the at least one respective slot extends only partially around the longitudinal path;
irradiating the object with the radiation; and
detecting radiation interacting with the object.

65. The method of claim 64, wherein the radiation source comprises a chamber having a longitudinal axis and an outlet along the longitudinal axis, the method comprising generating radiation to irradiate the object by:
accelerating electrons through the chamber; and
colliding the electrons with a target displaced from the outlet of the chamber.

66. The method of claim 64, comprising conveying the object along a second axis substantially parallel to the longitudinal path, through the radiation beam.

67. The method of claim 64, further comprising:
emitting a plurality of radiation beams from the source, each radiation beam being emitted in a direction transverse to the longitudinal axis;
irradiating a respective plurality of objects with the plurality of radiation beams; and
detecting radiation interacting with each of the objects.

68. The method of claim 64, comprising irradiating the object with X-ray radiation.

69. The method of claim 64, comprising irradiating a cargo container.

70. The method of claim 64, comprising:
detecting radiation transmitted through the object.

71. The method of claim 64, comprising:
collimating the generated radiation by a slot transverse to the axis.

72. The method of claim 64, comprising:
colliding high energy electrons traveling undeflected along the longitudinal path, from the source to the point target, with the point target.

73. An X-ray source comprising:
a housing defining a chamber to accelerate electrons and an output of the chamber, the chamber having a first longitudinal axis, wherein the output is aligned with the first longitudinal axis to allow passage of accelerated electrons from the chamber;
a tube defining a passage having a second longitudinal axis, the tube having a proximal end coupled to the output of the housing such that the second longitudinal axis is aligned with the first longitudinal axis and accelerated electrons can enter the passage;
a target material within the tube, wherein impact of the target material by accelerated electrons causes generation of X-ray radiation; and
shielding material around at least a portion of the tube around the target, the shielding material defining a slot therethrough, the slot to allow passage of generated radiation, during operation;
wherein the slot is centered about an axis transverse to the first and second longitudinal axes;
the source further comprising:
a bend magnet;
a second tube coupling the bend magnet to the output of the housing, wherein the proximal end of the first tube is coupled to the output of the housing by the bend magnet and the second tube;
a third tube having a first end coupled to the bend magnet;
a second target material within the third tube; and
second shielding material around at least a portion of the third tube surrounding the second target material, the second shielding material defining a second slot therethrough;
whereby electrons exiting the housing are selectively directed through the first or third tube, to the first or second target, respectively, by the bend magnet.

74. The X-ray source of claim 73, wherein the bend magnet is an electromagnet.

75. The X-ray source of claim 73, further comprising:
a second bend magnet; and
a fourth tube coupling the first bend magnet to the second bend magnet;

wherein:
the third tube is coupled to the first bend magnet through the fourth tube and the second bend magnet; and
the second tube, the bend magnet and the first target are aligned along the first and second longitudinal axes.

76. The X-ray source of claim 75, wherein the second bend magnet is an electromagnet or a permanent magnet.

77. The X-ray source of claim 73, wherein:
the first and second slots each have a first dimension and a second dimension; and
the first dimension and the axis of each slot lie in respective planes transverse to the first and second longitudinal axes.

78. The X-ray source of claim 73, wherein:
the chamber is adapted to accelerate electrons such that the impact of the first and second target material by the accelerated electrons causes generation of X-ray radiation having a peak energy of at least 1 MeV.

79. A radiation source comprising:
a source of charged particles;
a target material, wherein charged particles emitted by the source travel along a longitudinal path from the source to the target material, the target material generating radiation due to impact of the charged particles with the target, the radiation having a peak energy of at least 1 MeV, during operation, the longitudinal path lying along a longitudinal axis; and
shielding material around at least a portion of the target, the shielding material defining a slot therethrough to allow passage of generated radiation, during operation;
wherein the slot has a first dimension and a second dimension perpendicular to the first dimension, the first dimension lying in a plane including the longitudinal axis, the slot being centered about an axis in the first plane forming an angle with the longitudinal axis within a range of 90 degrees plus or minus 10 degrees, and
the slot extends in the second dimension only partially around the longitudinal axis.

80. The radiation source of claim 79, further comprising:
a housing defining a chamber to accelerate the charged particles and an output of the chamber to allow passage of accelerated charged particles from the chamber, along the longitudinal path; and
a tube defining a passage, the tube having a proximal end coupled to the output of the housing such that the longitudinal path of the charged particles extends along the passage;
wherein:
the target material is within the tube, along the longitudinal path; and
the shielding material is around at least a portion of the tube around the target.

81. The radiation source of claim 79, wherein:
the shielding material is non-rotatable.

82. The radiation source of claim 81, wherein:
the shielding material is immobile.

83. The radiation source of claim 79, wherein:
the slot defines a fan beam with a width; and
the first dimension defines the width of the fan beam.

84. The radiation source of claim 79, wherein:
the slot extends up to 110 degrees around the second longitudinal axis.

85. The radiation source of claim 84, wherein:
the slot extends up to 90 degrees around the second longitudinal axis.

86. A source of X-ray radiation comprising:
a housing defining a chamber to accelerate electrons and an output of the chamber, the chamber having a first longitudinal axis, wherein the output is aligned with the first longitudinal axis to allow passage of accelerated electrons from the chamber;
a tube defining a passage having a second longitudinal axis, the tube having a proximal end coupled to the output of the housing such that the second longitudinal axis is aligned with the first longitudinal axis and accelerated electrons can enter the passage;
a target material within the tube, wherein impact of the target material by accelerated electrons causes generation of radiation having a peak energy of at least 1 MeV; and
immobile shielding material around at least a portion of the tube around the target, the shielding material defining a slot therethrough;
wherein the slot has a first dimension and a second dimension perpendicular to the first dimension, the first dimension being in a plane transverse to the first and second longitudinal axes, to allow passage of generated radiation, during operation.

87. The source of claim 86, wherein:
the slot defines a fan beam; and
the first dimension defines a width of the fan beam.

88. The radiation source of claim 86, wherein:
the plane forms an angle within a range of 90 degrees plus or minus 10 degrees with the first and second longitudinal axes.

89. A radiation source comprising:
a source of charged particles;
a target material lying along a path traversed by the charged particles, wherein impact of the charged particles with the target causes generation of radiation;
first shielding material around at least a portion of the target, the first shielding material defining a plurality of slots therethrough, at least some of the plurality of slots to allow passage of generated radiation, during operation; and
multiple units of second shielding material movably coupled to the source to selectively place at least some of the plurality of respective slots in an opened state or a closed state to selectively allow passage of generated radiation through at least some of the plurality of respective slots.

90. The radiation source of claim 89, wherein:
the multiple units of second shielding material are pivotally coupled to the radiation source.

91. The radiation source of claim 89, wherein:
at least one of the plurality of slots has a first dimension and a second dimension perpendicular to the first dimension, the first dimension lying in a plane transverse to the path.

92. The radiation source of claim 91, wherein:
the plane forms an angle with the path within a range of 90 degrees plus or minus 10 degrees.

93. The radiation source of claim 91, wherein:
at least one of the plurality of slots defines a fan beam with an arc; and
the first dimension defines the arc of the fan beam.

94. A system for examining an object, comprising:
at least first and second conveyor systems to position objects for examination; and
a source of radiation comprising:
a source of charged particles;

a target material, wherein the charged particles travel from the source to the target material during operation, the target material generating radiation due to impact of the charged particles with the target material;

shielding material around at least a portion of the target, the shielding material defining at least first and second slots therethrough to allow passage of generated radiation;

wherein:

the radiation source is positioned with respect to the first and second conveyor systems such that radiation passing through the first and second slots irradiate objects on the first and second conveyor systems, respectively, for examination; and the system further comprising:

means for opening and closing the first slot to selectively allow passage of generated radiation; and means for opening and closing the second slot to selectively allow passage of generated radiation.

95. The system of claim 94, wherein:

the first and second conveyor systems move respective objects through the system along first and second longitudinal paths, respectively.

96. The system of claim 94, comprising:

the longitudinal axes of the first and second conveyor systems are each parallel to the longitudinal path of the charged particles.

97. The system of claim 94, wherein:

the first slot and at least some of the second slots have a first dimension and a second dimension perpendicular to the first dimension; and the first dimensions of the first and the at least some of the second slots lie in respective planes transverse to a longitudinal axis of the source.

98. The system of claim 97, further comprising:

a fourth conveyor system to position an object for examination;

wherein:

the shielding material defines a fourth slot therethrough; and the radiation source is positioned with respect to the fourth conveyor system such that radiation passing through the fourth slot will irradiate an object on the fourth conveyor system for examination; and means for opening and closing the fourth slot, to selectively allow passage of generated radiation.

99. The system of claim 98, wherein:

the first, second, third, and fourth slots each have a first dimension and a second dimension perpendicular to the first dimension; and each of the first dimensions lie one or more respective planes transverse to a longitudinal axis of the source.

100. The system of claim 94, further comprising:

a third conveyor system to position an object for examination;

wherein:

the shielding material defines a third slot therethrough; and the radiation source is positioned with respect to the third conveyor system such that radiation passing through the third slot will irradiate an object on the third conveyor system for examination; and means for opening and closing the third slot, to selectively allow passage of generated radiation.

101. A method of generating radiation, comprising:

colliding charged particles with a target along first axis to generate radiation having a peak energy of at least 1 MeV; and collimating the generated radiation into a radiation beam centered about a second axis forming an angle with the first axis within a range of 90 degrees plus or minus 10 degrees, the radiation beam extending only partially around the first axis.

102. A radiation scanning system to examine an object, comprising:

a conveyor system to move an object through the system along a first longitudinal axis; and an elongated radiation source comprising a source of charged particles and a point target along a second longitudinal axis, wherein the charged particles travel along the second longitudinal axis from the source of charged particles to the target during operation, the radiation source emitting radiation with a peak energy of at least 1 MeV, during operation;

wherein the radiation source is supported adjacent to the conveying system such that the first longitudinal axis and the second longitudinal axis are parallel or form an angle of up to 45 degrees.

103. The system of claim 102, wherein the first longitudinal axis and the second longitudinal axis are parallel or form an angle of up to 10 degrees.

104. The system of claim 102, wherein the radiation source is an X-ray radiation source.

105. A radiation source comprising:

a source of charged particles;

a target material lying along a path traversed by the charged particles, wherein of the charged particles with the target causes generation of radiation;

first shielding material around at least a portion of the target, the first shielding material defining a plurality of slots therethrough, at least some of the plurality of slots allow passage of generated radiation, during operation; and second shielding material coupled to the source to selectively open and close at least some of the plurality of slots.

106. A method of examining contents of an object with a radiation source, the method comprising:

colliding high energy electrons traveling along a longitudinal path from a source to a point target along the path, the target being surrounded by non-rotating shielding material, to generate radiation;

collimating the generated radiation into at least one radiation beam transverse to the longitudinal path by at least one respective slot through the shielding material;

irradiating the object with the radiation; and detecting radiation transmitted through the object.

* * * * *